(12) United States Patent
Gustafsson et al.

(10) Patent No.: US 7,811,371 B2
(45) Date of Patent: Oct. 12, 2010

(54) RUBBER-POLYOLEFIN SURFACE COVERING

(75) Inventors: Peter Gustafsson, Ronneby (SE); Roland Karlsson, Ronneby (SE); Helena Martensson, Sturko (SE)

(73) Assignee: Tarkett SAS, Nanterre (FR)

( * ) Notice: Subject to any disclaimer, the term of this patent is extended or adjusted under 35 U.S.C. 154(b) by 695 days.

(21) Appl. No.: 11/632,261

(22) PCT Filed: Jul. 12, 2005

(86) PCT No.: PCT/EP2005/053326

§ 371 (c)(1),
(2), (4) Date: Jan. 11, 2007

(87) PCT Pub. No.: WO2006/005752

PCT Pub. Date: Jan. 19, 2006

(65) Prior Publication Data

US 2008/0053335 A1    Mar. 6, 2008

(30) Foreign Application Priority Data

Jul. 13, 2004    (EP) .................................. 04291801

(51) Int. Cl.
*C08L 93/00*    (2006.01)
*B05D 1/36*    (2006.01)

(52) U.S. Cl. .................. 106/241; 106/218; 106/287.24; 106/287.28; 427/201

(58) Field of Classification Search .................. 525/221
See application file for complete search history.

(56) References Cited

U.S. PATENT DOCUMENTS

| 5,244,942 | A  | * | 9/1993 | Hover et al. ................. 523/171 |
| 6,153,680 | A  | * | 11/2000 | Shah et al. ................... 525/222 |
| 6,398,369 | B1 |   | 6/2002 | Starling |
| 6,933,344 | B2 |   | 8/2005 | Shah et al. |
| 2002/0168500 | A1 | * | 11/2002 | Graab et al. ................. 428/143 |
| 2003/0052431 | A1 | * | 3/2003 | Shah et al. ..................... 264/50 |
| 2003/0212211 | A1 | * | 11/2003 | Lenox et al. ................. 525/222 |
| 2003/0224128 | A1 | * | 12/2003 | Ylitalo et al. .............. 428/32.1 |

FOREIGN PATENT DOCUMENTS

| EP | 385053 | A | * | 9/1990 |
| EP | 1361249 |  |  | 11/2003 |
| EP | 1389519 |  |  | 2/2004 |
| EP | 1389519 | A1 | * | 2/2004 |

* cited by examiner

*Primary Examiner*—Mark Eashoo
*Assistant Examiner*—David Karst
(74) *Attorney, Agent, or Firm*—Viksnins Harris & Padys PLLP

(57) ABSTRACT

A surface covering comprising between 5 and 50% w/w of thermoplastic material, between 5 and 50% w/w of elastomer material, between 5 and 20% w/w of a high styrene resin, between 25 and 70% w/w of filler and between 1% and 10% w/w of vulcanisation system.

12 Claims, 1 Drawing Sheet

RUBBER-POLYOLEFIN SURFACE COVERING

CROSS-REFERENCE TO RELATED APPLICATION

Figure 1:
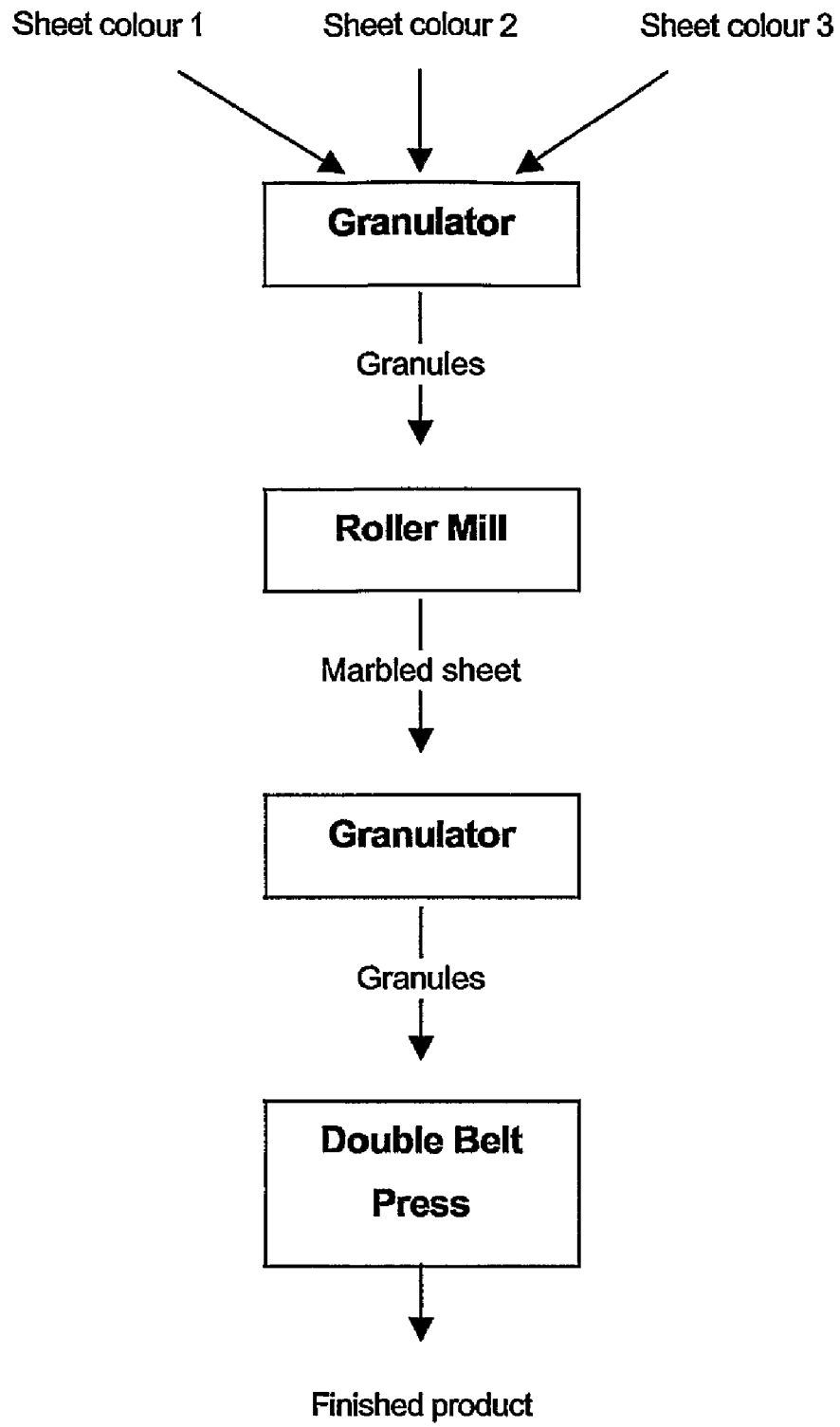

This application is a National Stage application under 35 U.S.C. §371 and claims benefit under 35 U.S.C. §119(a) of International Application No. PCT/EP2005/053326 having an International Filing Date of Jul. 12, 2005, which claims benefit of European Application Serial No. 04291801.1 filed on Jul. 13, 2004.

FIELD OF THE INVENTION

The invention relates to a rubber-polyolefin surface covering.

DESCRIPTION OF THE-RELATED ART

Standard rubber floor coverings are well known in public. The major advantages of such floor coverings are their dimensional stability, the absence of creeping and their relatively high resistance to abrasion. However, the rubber floor coverings are suffering from low tear and stain resistance and are also sensitive for scratches. Smell is another disadvantage.

A standard rubber formulation is as follows:

| | |
|---|---|
| rubber | 20-32% |
| Filler (clay + silicates) | 63% |
| Vulcanisation agent + processing aids | 5-7% |

OBJECT OF THE INVENTION

The object of the present invention is to provide an improved surface covering as far as tear and stain resistance are concerned.

SUMMARY OF THE INVENTION

In accordance with the present invention, a surface covering comprising between 5 and 50% w/w of elastomer material, between 5 and 50% w/w of thermoplastic material, between 25 and 70% w/w of filler and between 1% and 10% w/w of vulcanisation system.

An example of vulcanisation system is TBBS, ZBEC, CBS, sulphur, stearic acid and zinc oxide.

Such surface coverings have a higher tear and stain resistance than the traditional rubber surface coverings.

An additional advantage of the rubber-PO surface coverings of the invention is that the sheets and tiles can be sealed, by welding them at their seams, as usual in PVC flooring which is not possible in standard rubber flooring.

Formulation evaluations have shown that the content of thermoplastic material has to be between 5 and 50%, the elastomer content of the material has to be between 5 and 50% and the filler level between 25 and 70%. The vulcanisation system is of traditional type.

The use of the following thermoplastic polymers or mixtures thereof in the formulations is especially preferred and enhances specific properties of the finished product:

UHMWPE (Ultra High Molecular Weight Polyethylene): improves the surface of the flooring.

Acid copolymer (such as E/MMA, E/M) or terpolymer: improves the tear and scratch resistance and gives low friction.

Ionomer: improves the scratch and tear resistance and gives low friction.

Polystyrene: improves the scratch and scuffmark resistance.

Acrylate: EBA (Ethylene Butyl Acrylate) improves the tear resistance and gives low friction.

EMA (Ethylene Methyl Acrylate) improves the tear resistance.

EVA (Ethylene Vinyl Acetate) improves the tear resistance.

Ethylene Octane Copolymer improves the tear resistance.

Furthermore, PVC (Poly Vinyl Chloride), PE (Polyethylene), PP (Polypropylene), Polybutylene or mixtures thereof can also be incorporated in the product.

Of the tested thermoplastic polymers, ionomers are especially preferred since they give better results as far as the floor properties are concerned. They improve the tear resistance, the friction and the scratch resistance of the flooring even further. An addition of 5 to 50% w/w ionomers, preferably between 15 to 20% gives the best results.

The following elastomer materials (rubbers) are suitable to use in the context of the invention:

SBR (Styrene Butadiene Rubber)
NBR (Nitrile Butadiene Rubber)
NR (Natural Rubber)
IR (Isoprene rubber)
EPDM (Ethylene Propylene Rubber)

All rubber types improve the dimensional stability and the creeping properties since the polymer chains are crosslinked in the vulcanization process.

First trials have shown that, by simply mixing the different components, it was hardly possible to process the formulation due to the very high viscosity at high temperature. Significant improvements in the processability were obtained by adding an EBA polymer and/or by adding high styrene resin (SBR with a high amount of bound styrene, such as from 50 to 85%, preferably 55 to 75% of bound styrene), preferably in quantities between 5 and 20% w/w, especially between 7 and 15% w/w.

It was also helpful to add silicones, e.g. polymethylsiloxan, between 0.5 and 5% w/w, preferably between 1.5 and 2.5% w/w to lower friction during the production process.

The surface covering may further comprises a top coating comprising a PU-dispersion, a PU-solution, a 2-components PU, a PU acrylate, an epoxy acrylate, a polyester acrylate, a polyether acrylate, a silicone acrylate or a mixture thereof to further reinforce the scratch resistance and other properties.

In a preferred embodiment, the top coating comprises a water based UV-curable PU-acrylate dispersion with a dry content of between 5% and 80% w/w, preferably between 20 and 60% w/w.

The top coating has usually a thickness of between 0.5 µm to 100 µm.

DETAILED DESCRIPTION WITH RESPECT TO THE FIGURES

The present invention will be more apparent from the following description of a not limiting embodiment with reference to the attached drawings, wherein FIG. 1 shows a schematic flow-sheet of the production process.

Typical formulations for the product according to the invention are as follows:

| Material | Example 1 (%) | Example 2 (%) | Example 3 (%) |
| --- | --- | --- | --- |
| SBR with 23% styrene content | 21 | — | 15 |
| Natural rubber | — | — | 6 |
| NBR | — | 35 | — |
| High styrene resin (62% styrene) | 9 | — | 9 |
| Filler (chalk/clay/silica/dolomite) | 45 | 50 | 45 |
| Ionomer | 15 | 10 | 20 |
| EBA | 5 | — | — |
| Processing aids, vulcanisation | 5 | 5 | 5 |

The vulcanization package is of traditional type.

The production process for a homogenous rubber-PO floor is described below with regard to FIG. 1.

A rubber compounder delivers a single coloured compound in sheet form. Three sheets of different colours are granulated and calendered in a roller mill to form a marbled sheet. In this process stage the material is not supposed to vulcanize, therefore the temperature of the roller mill should be below 130° C. The process parameters of the roller mill are set as follows: Speed: 5-10 m/min, Temperature: <130° C.

The thus obtained sheet is then granulated to obtain granules of suitable sizes (e.g. 0.1 to 40 mm). The granules are scattered on the steel belt in a double belt press and pressed to a multicoloured, marbled sheet. In this process stage, the material is vulcanized. The temperature of the heating zone in the belt press exceeds 130° C. which is the temperature at which the vulcanization package works. The process parameters of the double belt press are set as follows: Pressure: 3-20 bar, Temperature: 130-200° C., Speed: >2m/min.

The properties of a standard rubber floor compared to the rubber-PO floor according to the invention.

|  | Rubber floor | Rubber-PO floor | Demands |
| --- | --- | --- | --- |
| Friction | 2.3-2.6 | 1.5 | 1.35-2.0 |
| Tear resistance (N) | 10 | 30-35 | >30 |
| Scratch resistance (N) | | | |
| Visible | 1 | 1-2 | 2-3 |
| To be felt | 2 | 4 | 3-4 |
| Stain resistance | | | |
| Water | 2.1 | 4.7 | 4 |
| Alcohol | 1.0 | 1.3 | 1 |
| Oil | 1.8 | 1.7 | 1.5-2 |
| Castor Chair (partly no glue) 25 000 revolutions | Ok | Ok | Ok |

The invention claimed is:

1. A surface covering comprising between 5 and 50% w/w of thermoplastic material chosen among the group constituted of Ultra High Molecular Weight Polyethylene, ionomer, acid copolymer or terpolymer, Polystyrene, Ethylene Butyl Acrylate, Ethylene Methyl Acrylate, Ethylene Vinyl Acetate, Ethylene Octane Copolymers, Poly Vinyl Chloride, Polyethylene, Polypropylene, Polybutylene or mixtures thereof, between 5 and 50% w/w of elastomer material chosen among the group constituted of Styrene Butadiene Rubber, Nitrile Butadiene Rubber, Natural Rubber, Isoprene Rubber, Ethylene Propylene Rubber or mixtures thereof, between 5 and 20% w/w of a high styrene resin, between 25 and 70% w/w of filler and between 1% and 10% w/w of vulcanisation system, wherein the surface covering comprises between 5 to 50% w/w ionomers.

2. The surface covering according to claim 1, wherein the surface covering further comprises between 0.5 and 5% w/w silicones.

3. The surface covering according to claim 2, wherein the surface covering comprises between 1.5 and 2.5% w/w silicones.

4. The surface covering according to claim 1, wherein the surface covering comprises a top coating comprising a PU-dispersion, a PU-solution, a 2-components PU, a PU acrylate, an epoxy acrylate, a polyester acrylate, a polyether acrylate, a silicone acrylate or a mixture thereof.

5. The surface covering according to claim 4, wherein the top coating comprises a water based UV-curable PU-acrylate dispersion with a dry content of between 5 and 80% w/w.

6. The surface covering according to claim 5, wherein the top coating comprises a water based UV-curable PU-acrylate dispersion with a dry content of between 20 and 60% w/w.

7. The surface covering according to claim 4, wherein the top coating has a thickness of between 0.5 $\mu$m to 100 $\mu$m.

8. The surface covering according to claim 1, wherein the surface covering comprises between 15 to 20% w/w ionomers.

9. A process for producing a surface covering comprising the following steps:
   a) mixing between 5 and 50% w/w of thermoplastic material chosen among the group constituted of Ultra High Molecular Weight Polyethylene, ionomer, acid copolymer or terpolymer, Polystyrene, Ethylene Butyl Acrylate, Ethylene Methyl Acrylate, Ethylene Vinyl Acetate, Ethylene Octane Copolymers, Poly Vinyl Chloride, Polyethylene, Polypropylene, Polybutylene or mixtures thereof, between 5 and 50% w/w of elastomer material chosen among the group constituted of Styrene Butadiene Rubber, Nitrile Butadiene Rubber, Natural Rubber, Isoprene Rubber, Ethylene Propylene Rubber or mixtures thereof, between 5 and 20% w/w of a high styrene resin, between 25 and 70% w/w of filler and between 1% and 10% w/w of vulcanisation system, wherein the thermoplastic material comprises between 5 and 50% w/w ionomers,
   b) calendering said mixture of thermoplastic material, elastomer material, high styrene resin, filler and vulcanisation system at temperature and pressure conditions that do not vulcanise the elastomer material to form at least two calendered sheets,
   c) granulating the sheets so as to obtain granules,
   d) mixing said granules and forming a marbled surface covering with the granules and vulcanising the elastomer material.

10. The process according to claim 9, wherein the process further comprises the following steps :
   c1) forming a marbled sheet of the granules,
   c2) granulating said marbled sheet so as to form granules.

11. The process according to claim 10, wherein the forming of a marbled surface covering of step d) comprises depositing the granules on a double belt type press and pressing and vulcanising the granules so as to form a surface covering.

12. The method according to claim 9, wherein the thermoplastic material comprises between 15 to 20% w/w ionomers.

* * * * *